US008495867B2

(12) United States Patent
Ramanathan et al.

(10) Patent No.: US 8,495,867 B2
(45) Date of Patent: Jul. 30, 2013

(54) HEATING MODULE FOR AN EXHAUST GAS TREATMENT SYSTEM

(75) Inventors: Karthik Ramanathan, Karnataka (IN); Se H. Oh, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 358 days.

(21) Appl. No.: 12/915,663

(22) Filed: Oct. 29, 2010

(65) Prior Publication Data

US 2012/0107187 A1    May 3, 2012

(51) Int. Cl.
*F01N 3/00* (2006.01)
(52) U.S. Cl.
USPC .......... 60/286; 60/287; 60/300; 60/303; 422/109; 422/169; 422/173
(58) Field of Classification Search
USPC .......... 60/286, 287, 292, 300, 303; 422/108, 422/109, 169, 173, 174
See application file for complete search history.

(56) References Cited

U.S. PATENT DOCUMENTS

| 4,404,795 | A | * | 9/1983 | Oishi et al. ................ 60/274 |
| 5,155,995 | A | * | 10/1992 | Kinnear et al. ............. 60/300 |
| 5,271,906 | A | * | 12/1993 | Yuuki et al. ................ 422/177 |
| 5,388,406 | A | * | 2/1995 | Takeshima et al. ......... 60/297 |
| 5,447,696 | A | * | 9/1995 | Harada ....................... 422/174 |
| 5,802,845 | A | * | 9/1998 | Abe et al. ................... 60/274 |
| 7,550,119 | B2 | * | 6/2009 | Kojima ....................... 422/180 |

* cited by examiner

*Primary Examiner* — Binh Q Tran
(74) *Attorney, Agent, or Firm* — Quinn Law Group, PLLC

(57) ABSTRACT

An exhaust gas treatment system includes a heating module for heating exhaust gas upstream of a main catalytic converter. The heating module includes a first heating core having a first core volumetric size and a second heating core having a second core volumetric size that is less than the first core volumetric size. The first heating core with the larger first core volumetric size is configured to optimize pre-crank heating, while the second heating core with the smaller second core volumetric size is configured to optimize post-crank heating. The first heating core and the second heating core may be arranged in series with each other or in parallel with each other.

18 Claims, 2 Drawing Sheets

HEATING MODULE FOR AN EXHAUST GAS TREATMENT SYSTEM

TECHNICAL FIELD

The invention generally relates to an exhaust gas treatment system for treating exhaust gas from an internal combustion engine, and more specifically to a heating module of the exhaust gas treatment system

BACKGROUND

Vehicles with an Internal Combustion Engine (ICE) include an exhaust gas treatment system for reducing the toxicity of the exhaust gas from the engine. The treatment system typically includes a main catalytic converter, which includes a main catalyst that reduces nitrogen oxides in the exhaust gas to nitrogen and carbon dioxide or water, as well as oxidizes carbon monoxide (CO) and unburnt hydrocarbons (HCs) to carbon dioxide and water. The main catalyst may include, but is not limited to, Platinum Group Metals (PGM). The main catalyst must be heated to a light-off temperature of the main catalyst before the main catalyst becomes operational. Accordingly, the exhaust gas must heat the main catalyst to the light-off temperature before the reaction between the main catalyst and the exhaust gas begins. The majority of the pollutants, particularly the majority of the CO and HCs emitted during the operation of the engine occur prior to the main catalyst reaching the light-off temperature.

In order to speed the heating of the main catalyst to the light-off temperature and reduce the pollutants prior to the main catalyst reaching the light-off temperature, the exhaust gas treatment system may also include a light-off catalyst that is disposed upstream of the main catalyst. The light-off catalyst, due to a high PGM content, readily promotes exothermic reactions, such as the oxidation of the CO and HCs to reduce the pollutant concentrations and to generate additional heat, which is transferred to the main catalyst to reduce the time to heat the main catalyst to the light-off temperature.

Additionally, some vehicles may include an exhaust gas heater, such as but not limited to a heating module, to further heat the exhaust gas to reduce the time to heat the main catalyst to the light-off temperature. In conventional vehicles that are only powered by the internal combustion engine, the exhaust gas heater is limited to heating the exhaust gas only after the engine is started, i.e., post crank heating. In hybrid vehicles that further include an ICE/electric motor combination for powering the vehicle, the hybrid vehicle may power the exhaust gas heater prior to starting the engine, i.e., pre-crank heating using the battery, thereby further increasing the amount of heat supplied to the exhaust gas heater and reducing the time to heat the main catalyst to the light-off temperature once the engine is started.

SUMMARY

An exhaust gas treatment system for treating exhaust gas from an internal combustion engine is provided. The exhaust gas treatment system includes a main catalytic converter that is configured for reducing toxic emissions from the exhaust gas. A heating module is disposed upstream of the main catalytic converter. The heating module heats the exhaust gas. The heating module includes a first heating core configured for pre-crank heating prior to starting the internal combustion engine, and a second heating core configured for post-crank heating after the internal combustion engine is started.

A heating module for heating exhaust gas upstream of a main catalytic converter in an exhaust gas treatment system is also provided. The heating module includes a first heating core configured for pre-crank heating prior to starting the internal combustion engine, and a second heating core disposed downstream of the first heating core and configured for post-crank heating after the internal combustion engine is started.

A heating module for heating exhaust gas upstream of a main catalytic converter in an exhaust gas treatment system is also provided. The heating module includes a first heating core and a second heating core. The first heating core includes a first core volumetric size, and is configured for pre-crank heating prior to starting the internal combustion engine. The second heating core includes a second core volumetric size, and is configured for post-crank heating after the internal combustion engine is started. The second core volumetric size is smaller than the first core volumetric size. The second core volumetric size is between the range of five percent (5%) and fifty percent (50%) of the first core volumetric size, and the second core volumetric size is between the range of 0.03 liters and 0.05 liters.

Accordingly, the first heating core may be sized for efficient pre-crank heating, i.e., initial heating of the exhaust gas heater before the internal engine begins to operate, and the second heating core may be sized for efficient post-crank heating, i.e., heating of the exhaust gas after the engine is started. The combination of the first heating core and the second heating core bring the main catalytic converter up to a light-off temperature more quickly than a single heating core, thereby reducing the overall toxic emissions leaving the main catalytic converter and/or requirements for power/energy supply to the first heating core and the second heating core.

The above features and advantages and other features and advantages of the present invention are readily apparent from the following detailed description of the best modes for carrying out the invention when taken in connection with the accompanying drawings.

DETAILED DESCRIPTION

Figure 1:
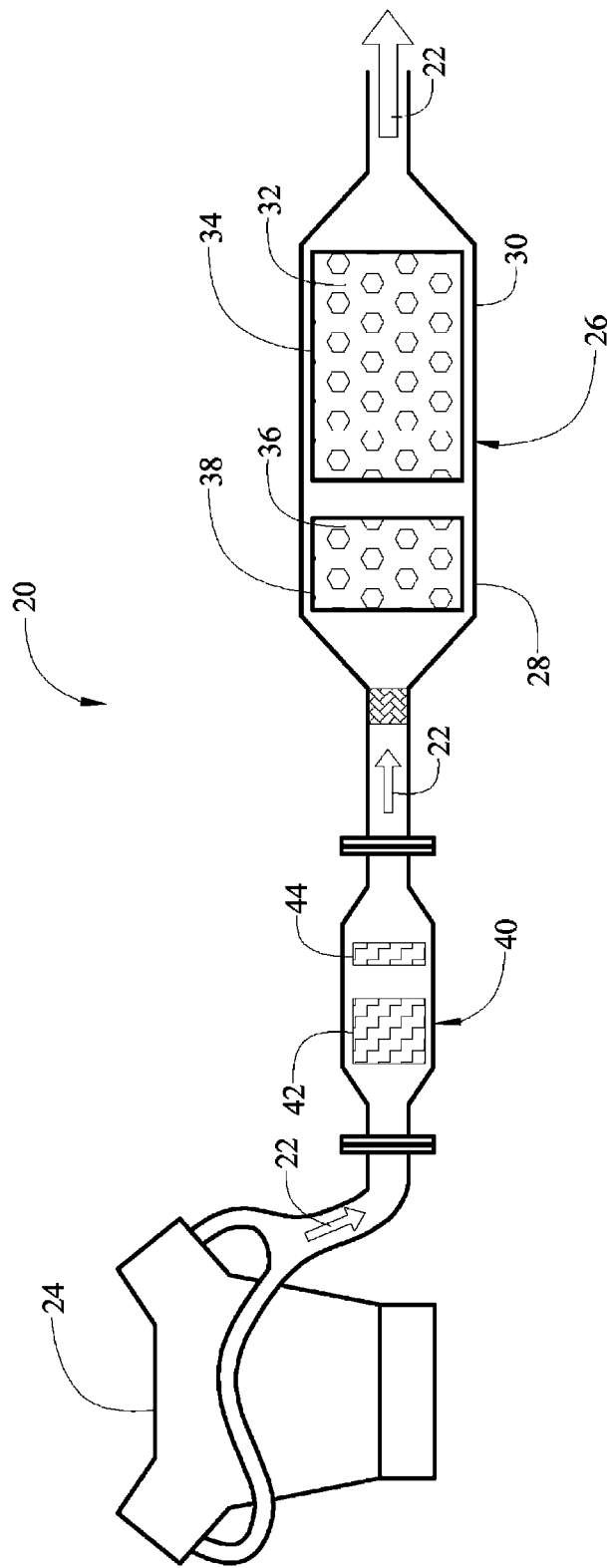
FIG. 1 is a schematic plan view of an exhaust gas treatment system.

Referring to FIG. 1, wherein like numerals indicate like parts throughout the several views, an exhaust gas treatment system is shown generally at 20. The treatment system 20 treats a flow of exhaust gas, indicated by arrow 22, from an Internal Combustion Engine (ICE) 24 to reduce the toxicity of the exhaust gas, i.e., to reduce toxic emissions of the exhaust gas, including but not limited to, nitrogen oxides (NO), carbon monoxide (CO) and/or hydrocarbons (HC).

The treatment system 20 includes a main catalytic converter 26. The main catalytic converter 26 is disposed downstream of the engine 24. The main catalytic converter 26 may include, but is not limited to, a three way catalytic converter. The three way catalytic converter may include Platinum Group Metals (PGM), and converts a percentage of the nitrogen oxides in the exhaust gas into nitrogen and carbon dioxide or water, as well as oxidizes a percentage of the carbon monoxide to carbon dioxide and oxidizes a percentage of the unburnt hydrocarbons to carbon dioxide and water.

The main catalytic converter 26 includes an upstream portion 28 and a downstream portion 30. The downstream portion 30 includes a main catalyst 32 for treating the exhaust gas as described above. A main catalyst core 34 is disposed within the downstream portion 30, and supports the main catalyst 32.

The upstream portion 28 of the main catalytic converter 26 includes a light-off catalyst 36. The light-off catalyst 36 may include, but is not limited to PGM as the active component. A light-off catalyst core 38 is disposed within the upstream portion 28 of the main catalytic converter 26, and supports the light-off catalyst 36. The light-off catalyst 36 oxidizes the CO and HCs in the exhaust gas exothermally to produce heat, which helps heat the main catalyst 32 to a light-off temperature of the main catalyst 32 sufficient to react with the exhaust gas.

The treatment system 20 further includes a heating module 40. The heating module 40 is disposed upstream of the main catalytic converter 26. The heating module 40 heats the exhaust gas prior to the exhaust gas entering the main catalytic converter 26. The heating module 40 includes a first heating core 42. The first heating core 42 may be heated through resistive heating. Accordingly, an electric current may be applied to the first heating core 42, with the resistance of the first heating core 42 generating heat, which is stored in the first heating core 42 and/or transferred to the exhaust gas flowing through the first heating core 42. It should be appreciated that the first heating core 42 may be heated in some other manner not shown or described herein. The heating module 40 further includes a second heating core 44. As with the first heating core 42, the second heating core 44 may also be heated through resistive heating. Accordingly, an electric current may be applied to the second heating core 44, with the resistance of the second heating core 44 generating heat, which is stored in the second heating core 44 and/or transferred to the exhaust gas flowing through the second heating core 44. It should be appreciated that the second heating core 44 may be heated in some other manner not shown or described herein.

The heating module 40 is powered to heat the exhaust gas in accordance with the heating strategy. For a hybrid vehicle powered by either the internal combustion engine 24 and/or a separate ICE/electric motor combination (not shown), the heating module 40 may be powered by either the engine 24 or the ICE/electric motor combination. If the vehicle is a hybrid vehicle, the heating module 40 may be powered by a battery pre-crank, i.e., pre-crank heating before the engine 24 is started, and/or the heating module 40 may be powered by the engine 24 post-crank, i.e., post-crank heating after the engine 24 is started. Accordingly, for hybrid vehicles the heating strategy may include a combination of pre-crank heating for a pre-determined amount of time at a pre-determined power level and post-crank heating for a pre-determined amount of time at a pre-determined power level.

It has been found that the efficiency of the exhaust gas treatment system 20 varies with the volumetric size of the heating module 40 for any given heating strategy. If the heating module 40 includes a smaller volumetric size, the power applied to the heating module 40 in accordance with the heating strategy quickly produces higher temperatures within the heating module 40 and quickly transfers the stored heat to the exhaust gas. However, because of the small volumetric size of the heating module 40, and thereby the small heat storage capacity, the heat transfer to the exhaust gas flowing through the heating module 40 occurs only over a short period of time. Heating modules having smaller volumetric sizes have been found to be more efficient for post-crank heating, i.e., heating the exhaust gas after the engine 24 has been started. If the heating module 40 includes a larger volumetric size, the power applied to the heating module 40 in accordance with the heating strategy produces lower temperatures within the heating module 40 and transfers the stored heat to the exhaust gas more slowly. However, because of the large volumetric size of the heating module 40, and thereby a larger heat storage capacity, the heat transfer to the exhaust gas flowing through the heating module 40 occurs over a longer period of time. Heating modules having larger volumetric sizes have been found to be more efficient for pre-crank heating. Pre-crank heating heats the heating module 40 prior to exhaust gas flowing through the heating module 40, thereby providing instantaneous heating of the exhaust gas as soon as the engine 24 is started and begins to operate. This is particularly beneficial for hybrid vehicles, where the internal combustion engine 24 may be turned off for extended periods of time when the vehicle is being powered solely by the battery, and the vehicle may employ pre-crank heating prior to starting the internal combustion engine 24.

In order to optimize the efficiency of the heating module 40, the first heating core 42 of the heating module 40 is configured for pre-crank heating prior to starting the internal combustion engine 24, and the second heating core 44 is configured for post-crank heating after the internal combustion engine 24 is started. As shown in FIG. 1, the first heating core 42 and the second heating core 44 are arranged in series relative to each other, with the first heating core 42, which is configured for pre-crank heating, disposed upstream of the second heating core 44, which is configured for post-crank heating.

The first heating core 42 includes a first core volumetric size and the second heating core 44 includes a second core volumetric size. The second core volumetric size is smaller than the first core volumetric size. Accordingly, the first core volumetric size may be optimized for pre-crank heating, and the second core volumetric size may be optimized for post-crank heating. The second core volumetric size may be between the range of five percent (5%) and fifty percent (50%) of the first core volumetric size. More specifically, the second core volumetric size may be between the range of fifteen percent (15%) and eighteen percent (18%) of the first core volumetric size. However, it should be appreciated that the difference in volumetric sizes of the first heating core 42 and the second core 44 may fall outside the ranges described above. Additionally, the second core volumetric size is preferably within the range of 0.03 liters and 0.05 liters. However, it should be appreciated that the second core volumetric size may include a value outside the above described range.

In operation, if the heating strategy requires pre-crank heating for a pre-determined period of time at a pre-determined power level, for example one hundred fifty seconds (150 sec) at nine hundred watts (900 W), then the first heating core 42 is heated for the pre-determined period of time at the pre-determined power level. Once the internal combustion engine 24 is started, the exhaust gas flows across the first heating core 42 so that the first heating core 42 may transfer the stored heat to the exhaust gas in accordance with the heating strategy. If the heating strategy requires post-crank heating for a pre-determined period of time at a pre-determined power level, for example one hundred seconds (100 sec) at fifteen hundred watts (1500 w), then the second heating core 44 is engaged for additional post-crank heating of the exhaust gas in accordance with the heating strategy. Accordingly, the first heating core 42 is used for pre-crank heating, and the second heating core 44 is used for post-crank heating.

Figure 2:
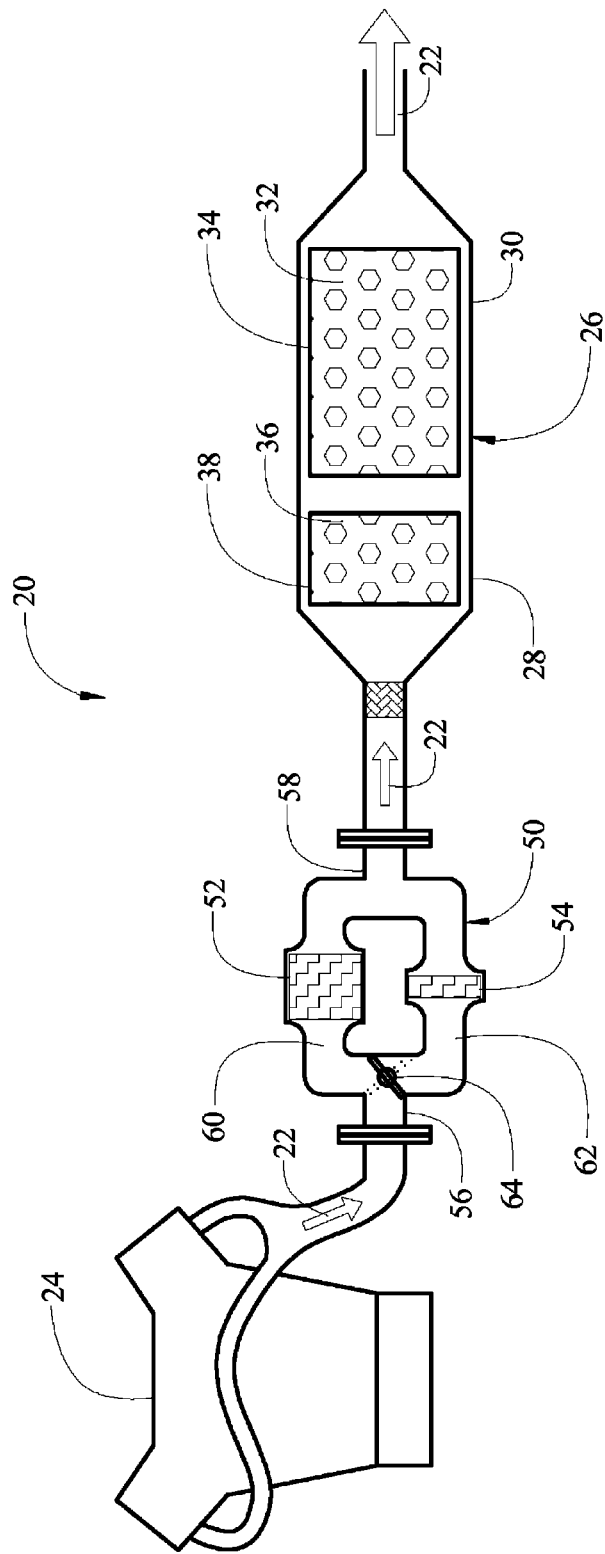
FIG. 2 is a schematic plan view of an alternative embodiment of the exhaust gas treatment system.

Referring to FIG. 2, an alternative embodiment of the heating module is generally shown at 50. The heating module 50 includes a first heating core 52 and a second heating core 54. The first heating core 52 and the second heating core 54 are arranged in parallel relative to each other.

The heating module 50 includes an inlet 56, an outlet 58, a first flow path 60 and a second flow path 62. The inlet 56 is configured for receiving the exhaust gas from the internal combustion engine 24. The outlet 58 is configured for exhausting the exhaust gas from the heating module 50 and directing the exhaust gas to the main catalytic converter 26. The first flow path 60 connects the inlet 56 and the outlet 58 in fluid communication. The second flow path 62 also connects the inlet 56 and the outlet 58 in fluid communication. However, the second flow path 62 is distinct and separate from the first flow path 60. The first heating core 52 is disposed within the first flow path 60, and the second heating core 54 is disposed within the second flow path 62.

The heating module 50 includes a flow control device 64 disposed near the inlet 56 and adjacent an upstream end of the first flow path 60 and the second flow path 62. The flow control device 64 is selectively operable to control the flow of the exhaust gas between the first heating core 52 and the second heating core 54. The flow control device 64 may include a flow diverter or the like. Accordingly, the flow control device 64 may be moveable between a first position directing the exhaust gas through the first flow path 60 to the first heating core 52, and a second position directing the exhaust gas through the second flow path 62 to the second heating core 54.

In operation, if the heating strategy requires only pre-crank heating, then the first heating core 52 is heated for the pre-determined period of time at the pre-determined power level prior to starting the engine in accordance with the heating strategy. Once the internal combustion engine 24 is started, the flow control device 64 directs the flow of exhaust gas through the first flow path 60 so that the first heating core 52 may transfer the stored heat to the exhaust gas in accordance with the heating strategy. The flow control device 64 directs the exhaust gas through the first heating core 52 so long as a temperature difference between the first heating core 52 and the exhaust gas entering the first heating core 52 is greater than a critical temperature, for example until the temperature difference is greater than fifteen degrees Celsius (15° C.). Once the temperature difference falls below the critical temperature, the flow control device 64 may direct the exhaust gas through the second flow path 62 and across the second heating core 54 to minimize heat loss through the heating module 50.

If the heating strategy requires only post-crank heating, then the flow control device 64 may switch from the first position to the second position to direct the exhaust gas through the second flow path 62 and across the second heating core 54 for post-crank heating in accordance with the heating strategy. Accordingly, the flow control device 64 may direct the exhaust gas through the second heating core 54 immediately upon the engine 24 starting, and maintains the flow of exhaust gas through the second heating core 54.

If the heating strategy requires a combination of pre-crank heating and post-crank heating, then the first heating core 52 is heated prior to starting the engine in accordance with the heating strategy. Once the internal combustion engine 24 is started, the flow control device 64 directs the flow of exhaust gas through the first flow path 60 so that the first heating core 52 may transfer the stored heat to the exhaust gas in accordance with the heating strategy. The flow control device 64 may direct the exhaust gas through the first heating core 52 so long as a temperature difference between the first heating core 52 and the exhaust gas entering the first heating core 52 is greater than a critical temperature, for example until the temperature difference is greater than fifteen degrees Celsius (15° C.). Once the temperature difference falls below the critical temperature, the flow control device 64 may direct the exhaust gas through the second flow path 62 and across the second heating core 54 for post-crank heating in accordance with the heating strategy. It should be appreciated that the flow of exhaust gas may be transitioned from the first heating core 52 to the second heating core 54 based upon a control algorithm that depends upon the temperature difference between the first heating core 52 and the exhaust gas entering the first heating core 52, whereby the exhaust gas flows through the first heating core 52 initially, and tapers down after a period of time as the flow through the second heating core 54 simultaneously increases. Alternatively, the post-crank heating of the second heating core 54 may not begin until the temperature difference between the first heating core 52 and the exhaust gas entering the first heating core 52 reaches a pre-determined value, for example one hundred degrees Celsius (100° C.), so that by the time the temperature difference reaches a critical temperature, for example fifteen degrees Celsius (15° C.), the second heating core 54 has been pre-heated to a sufficiently high temperature and the exhaust gas may be directed to the second heating core 54 for post-crank heating in accordance with the heating strategy. It should be appreciated that the control of the exhaust gas flowing through the first heating core 52 and the second heating core 54 may differ from the scenarios described herein.

While the best modes for carrying out the invention have been described in detail, those familiar with the art to which this invention relates will recognize various alternative designs and embodiments for practicing the invention within the scope of the appended claims.

The invention claimed is:

1. An exhaust gas treatment system for treating exhaust gas from an internal combustion engine, the exhaust gas treatment system comprising:
   a main catalytic converter configured for reducing toxic emissions from the exhaust gas; and
   a heating module disposed upstream of the main catalytic converter for heating the exhaust gas, wherein the heating module includes:
      a first heating core configured for pre-crank heating prior to starting the internal combustion engine; and
      a second heating core configured for post-crank heating after the internal combustion engine is started;
      wherein the first heating core includes a first core volumetric size and the second heating core includes a second core volumetric size, with the second core volumetric size smaller than the first core volumetric size.

2. An exhaust gas treatment system as set forth in claim 1 wherein the second core volumetric size is between the range of five percent (5%) and fifty percent (50%) of the first core volumetric size.

3. An exhaust gas treatment system as set forth in claim 1 wherein the second core volumetric size is between the range of 0.03 liters and 0.05 liters.

4. An exhaust gas treatment system as set forth in claim 1 wherein the first heating core and the second heating core are arranged in series relative to each other.

5. An exhaust gas treatment system as set forth in claim 4 wherein the first heating core is disposed upstream of the second heating core.

6. An exhaust gas treatment system as set forth in claim 1 wherein the first heating core and the second heating core are arranged in parallel relative to each other.

7. An exhaust gas treatment system as set forth in claim 6 wherein the heating module includes a flow control device for controlling the flow of the exhaust gas to either the first heating core or the second heating core.

8. An exhaust gas treatment system as set forth in claim 7 wherein the heating module includes an inlet configured for receiving the exhaust gas from the internal combustion engine, and outlet for exhausting the exhaust gas from the heating module, a first flow path connecting the inlet and the outlet in fluid communication, and a second flow path separate from the first flow path and connecting the inlet and the outlet in fluid communication, wherein the first heating core is disposed within the first flow path and the second heating core is disposed within the second flow path.

9. An exhaust gas treatment system as set forth in claim 8 wherein the flow control device is selectively operable to control the flow of the exhaust gas between the first flow path and the second flow path.

10. An exhaust gas treatment system as set forth in claim 9 wherein the main catalytic converter includes a light-off catalyst and a main catalyst disposed downstream of the light-off catalyst, wherein the light-off catalyst is configured for oxidizing carbon monoxide and hydrocarbons in the exhaust gas exothermally to produce heat to warm the main catalyst to a light-off temperature, and wherein the main catalyst is configured for treating the exhaust gas to reduce toxic emissions from the exhaust gas.

11. A heating module for heating exhaust gas upstream of a main catalytic converter in an exhaust gas treatment system, the heating module comprising:
a first heating core configured for pre-crank heating prior to starting the internal combustion engine; and
a second heating core disposed downstream of the first heating core and configured for post-crank heating after the internal combustion engine is started;
wherein the first heating core includes a first core volumetric size and the second heating core includes a second core volumetric size, with the second core volumetric size smaller than the first core volumetric size.

12. A heating module as set forth in claim 11 wherein the second core volumetric size is between the range of five percent (5%) and fifty percent (50%) of the first core volumetric size.

13. A heating module as set forth in claim 12 wherein the second core volumetric size is between the range of 0.03 liters and 0.05 liters.

14. A heating module as set forth in claim 11 wherein the first heating core and the second heating core are arranged in series relative to each other.

15. A heating module as set forth in claim 14 wherein the first heating core is disposed upstream of the second heating core.

16. A heating module as set forth in claim 11 wherein the first heating core and the second heating core are arranged in parallel relative to each other.

17. A heating module as set forth in claim 16 wherein the heating module includes a flow control device selectively operable to control the flow of the exhaust gas between the first heating core and the second heating core.

18. A heating module for heating exhaust gas upstream of a main catalytic converter in an exhaust gas treatment system, the heating module comprising:
a first heating core including a first core volumetric size and configured for pre-crank heating prior to starting the internal combustion engine; and
a second heating core including a second core volumetric size and configured for post-crank heating after the internal combustion engine is started;
wherein the second core volumetric size is smaller than the first core volumetric size, with the second core volumetric size between the range of five percent (5%) and fifty percent (50%) of the first core volumetric size, and the second core volumetric size between the range of 0.03 liters and 0.05 liters.

* * * * *